United States Patent [19]

Furutsu

[11] Patent Number: 4,612,694

[45] Date of Patent: Sep. 23, 1986

[54] METHOD OF CONNECTING ENDS OF FILAMENTARY FASTENER

[75] Inventor: Akira Furutsu, Tokyo, Japan

[73] Assignee: Japan Bano'k Co., Ltd., Tokyo, Japan

[21] Appl. No.: 758,537

[22] Filed: Jul. 24, 1985

Related U.S. Application Data

[62] Division of Ser. No. 571,538, Jan. 17, 1984, Pat. No. 4,536,933.

[30] Foreign Application Priority Data

Jan. 31, 1983 [JP] Japan .................................. 58-12996

[51] Int. Cl.⁴ .............................................. B23P 11/02

[52] U.S. Cl. .......................................... 29/450; 29/453

[58] Field of Search ................. 29/450, 453, 235, 433, 29/241; 227/118, 67, 119, 144; 128/330

[56] References Cited

U.S. PATENT DOCUMENTS

| | | | |
|---|---|---|---|
| 3,711,134 | 1/1973 | Goldberg | 29/453 X |
| 3,812,859 | 5/1974 | Murphy et al. | 128/330 |
| 3,934,329 | 1/1976 | Satkin | 29/453 |
| 4,121,591 | 10/1978 | Hayes | 128/330 |
| 4,135,287 | 1/1979 | Silverbush | 227/18 |
| 4,286,642 | 9/1981 | Keatley | 29/453 X |
| 4,340,352 | 7/1982 | Hayberg | 29/453 X |
| 4,451,999 | 6/1984 | Yvorra | 128/330 X |
| 4,497,321 | 2/1985 | Fearing et al. | 29/268 X |

FOREIGN PATENT DOCUMENTS

| | | | |
|---|---|---|---|
| 633742 | 3/1933 | Fed. Rep. of Germany | 128/330 |
| 703853 | 2/1954 | United Kingdom | 29/268 |

*Primary Examiner*—Charlie T. Moon

*Attorney, Agent, or Firm*—Browdy and Neimark

[57] ABSTRACT

Disclosed is a method of connecting ends of a fastener of the type having a filament portion of a predetermined length, a tubular socket portion connected to one end of the filament portion and a pin portion connected to the other end of the filament portion, as well as a device suitable for carrying out this method. The device comprises a main body, a first arm provided on the front end of the main body, a second arm adapted to be moved towards and away from the first arm, a lever rotatably supported by the main body, a pulley operatively connected to the lever, a flexible member wound up by this pulley and adapted to be moved alternatingly into a first guide groove in the first arm and a second guide groove in the second arm, and a clamper provided on the end of the flexible member. The pin portion of the fastener is inserted into the socket portion thereof to connect the two ends of the fastener to each other by the relative movement of the first and second arms towards and away from each other.

2 Claims, 21 Drawing Figures

FIG.8
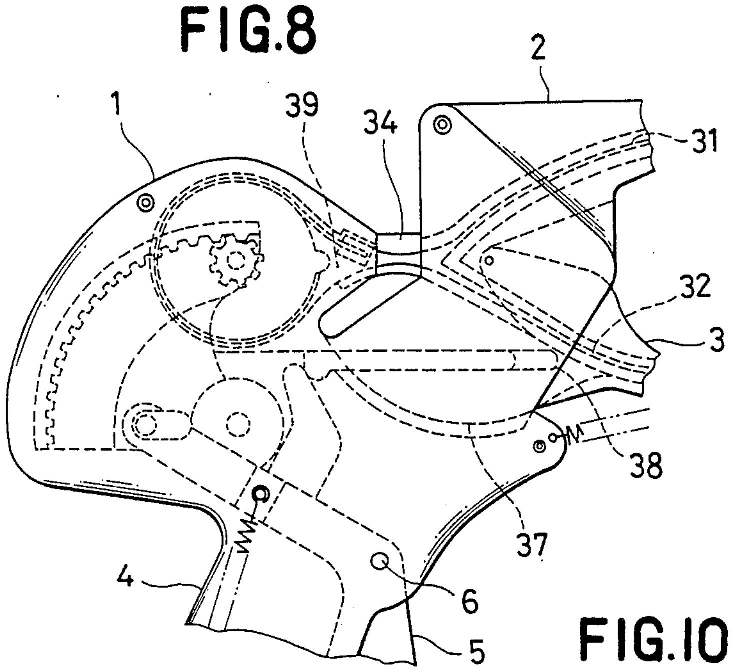
FIG.9
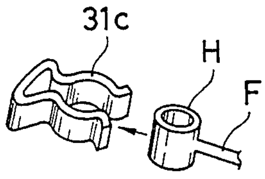
FIG.10
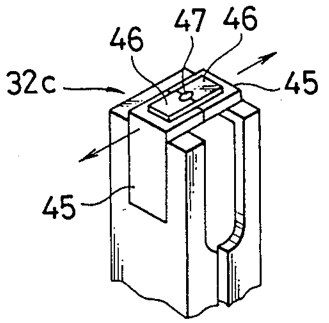
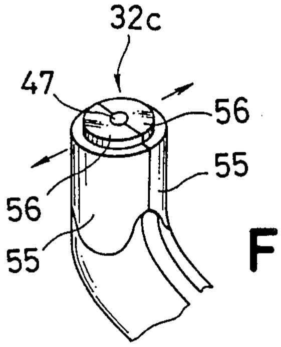
FIG.11

METHOD OF CONNECTING ENDS OF FILAMENTARY FASTENER

This is a division of application Ser. No. 571,538 filed Jan. 17, 1984, now U.S. Pat. No. 4,536,933.

BACKGROUND OF THE INVENTION

The present invention relates to a method of and a device for connecting ends of respective filamentary fasteners which are used for various purposes such as attaching labels or price tags to goods under sales, binding or connecting a plurality of goods to one another and so forth.

The filamentary fasteners in reference generally have an integral construction including a filament which is provided at its one end with a socket portion and at its other end with a pin portion adapted to be received in the socket portion, so that they are self-lockable.

With this fastener, a price tag or the like can be attached to goods by a single action, so that the attaching work is very much facilitated as compared with the conventional method relying upon a thread.

The attaching of a price tag or the like with the fastener, however, still requires a manual work for inserting the pin portion into the socket portion to complete a loop form of the fastener. Although this manual work is simple as compared with the work for attaching the tag by means of a thread, troubles such as fatigue or hurt at finger tips still remain unsolved. Namely, with the conventional method and device, fatigue of fingers is inevitable due to the manual work for pinching and connecting the ends of the fastener, resulting in a lowered efficiency of the work. In the worst case, the tips of fingers get hurt.

SUMMARY OF THE INVENTION

Accordingly, an object of the invention is to enable the user to efficiently connect the fastener without causing substantial fatigue of the fingers and any hurt of the tips of fingers.

To this end, according to an aspect of the invention, there is provided a method of connecting ends of a fastener of the type having a filament portion of a predetermined length, a tubular socket portion connected to one end of the filament portion and a pin portion connected to the other end of the filament portion, the method comprising making a first fixing portion clamp the socket portion of the fastener, making a second fixing portion clamp the pin portion of the fastener, and bringing the second fixing portion close to the first fixing portion thereby to insert the pin portion into the socket portion.

According to another aspect of the invention, there is provided a device for connecting ends of a fastener comprising a main body, a first arm provided on the front end of the main body, a second arm rockably secured to the first arm, a lever rotatably supported by the main body, a rotation transmission means for transmitting the rotation of the main body to a pulley, a flexible member wound up by this pulley and adapted to be moved alternately into a first guide groove in the first arm and a second guide groove in the second arm, a clamper provided on the end of the flexible member, and a slider operatively connected to the lever and adapted to move the second arm close to the first arm.

According to the invention, the user is not required to pinch the fastener ends by fingers nor to manually insert the pin portion into the socket portion of the fastener, so that fasteners can be fastened efficiently without causing any fatigue or hurt of the fingers.

BRIEF DESCRIPTION OF THE DRAWINGS

FIG. 8 is a rear elevational view of the fastener connecting device of the invention;

FIG. 9 is a perspective view of a first fixing portion;

FIG. 10 is a perspective view of a second fixing portion;

FIG. 11 is a perspective view of another example of the second fixing portion;

DESCRIPTION OF THE PREFERRED EMBODIMENTS

Figure 1:
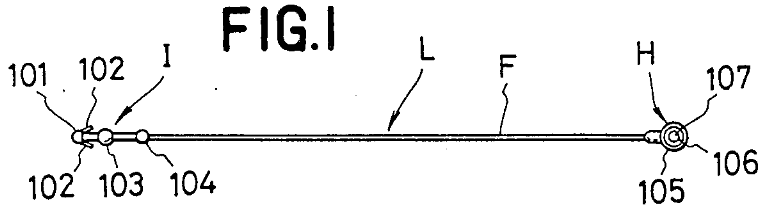
FIG. 1 is a plan view of a fastener.
Figure 2:
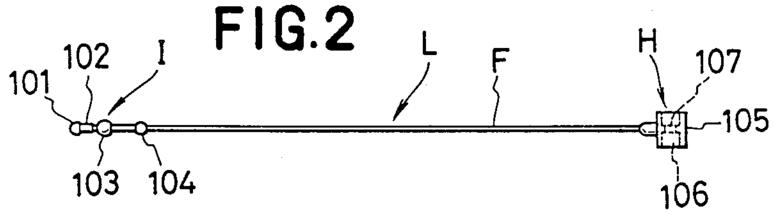
FIG. 2 is a front elevational view of a fastener.

Referring to the drawings, a fastener L to which the invention pertains has an integral body made of a plastic and, as will be best seen from FIGS. 1 and 2, consisting of a filament portion F which is provided at its one end with a socket portion H and at its other end with a pin portion I.

The pin portion I is composed of a head 101 having two first stoppers 102, a second stopper 103 provided behind the head 101, and a holder 104 provided behind the second stopper.

On the other hand, the socket H is composed of a sleeve 105, a partition wall 106 provided in the sleeve 105, and a hole 107 provided in the partition wall 106. The hole 107 is so sized as to permit the head 101 of the pin portion I but not to allow the second stopper 103 to pass therethrough.

Figure 3:
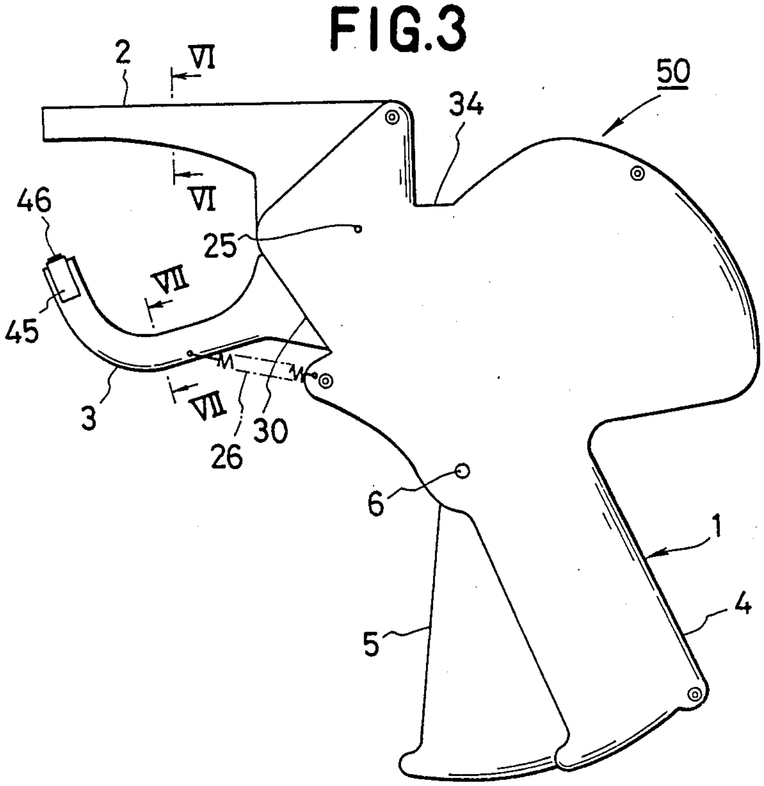
FIG. 3 is a front elevational view of a fastener connecting device in accordance with the invention.

As shown in FIG. 3, the fastener connecting device 50 of the invention has a generally pistol-like form as shown in FIG. 3, having a first arm 2 projected forwardly from the main body 1 and a second arm 3 bent in a form like the letter L. The second arm 3 is adapted to swing around an axis 25 by the operation of a lever 5 provided on the main body 1. A second spring 26 disposed between the second arm 3 and the main body 1 serves to urge the ends of the second arm 3 and the first arm 2 away from each other.

Figure 4:
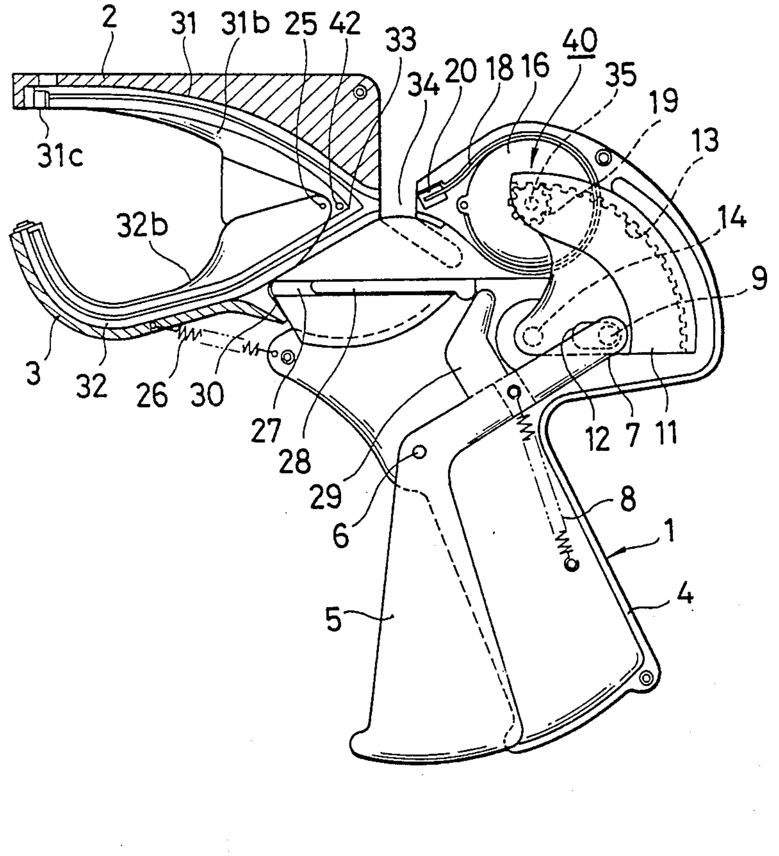
FIG. 4 is a partly-sectioned front elevational view of a half part of the fastener connecting device of the invention.

As will be seen from FIG. 4, the lever 5 is supported by the main body 1 through the shaft 6, and is biased clockwisely by a first spring 8 which acts between an extension 7 of the lever 5 and the main body 1.

The extension 7 of the lever 5 has a pin 9 which meshes with the elongated hole 12 of the internally-toothed gear 11. The internally-toothed gear 11 has a sector-like form with its arcuate portion toothed internally. The internally-toothed gear 11 has a shaft 14 coaxial therewith and is rotatably carried by the main body 1 through this shaft 14.

In addition, a pulley 16 is rotatably secured to the main body 1 by means of a shaft 35. The pulley 16 is provided on one side thereof with a pinion 19 which meshes with the internal teeth 13 of the internally-toothed gear.

The internally-toothed gear 11 is adapted to make about 90° rotation by a gripping or releasing of the lever 5. The rotation of the internally-toothed gear 11 causes a rotation of the pinion 19 meshing with the gear 11, i.e. a rotation of the pulley 16. The gear ratio, i.e. the ratio of number of teeth between the internally-toothed gear 11 and the pinion 19 is so selected that the 90° rotation of the internally-toothed gear 11 causes two rotations of the pinion 19, i.e. the pulley 16. The internally-toothed gear 11 and the pinion 19 in combination constitute a rotation transmission means 40 for rotating the pulley 16.

Figure 6:
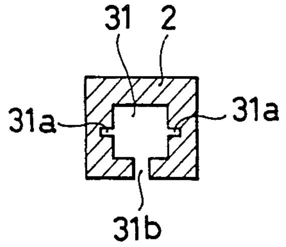
FIG. 6 is a sectional view taken along the line VI—VI of FIG. 3.
Figure 7:
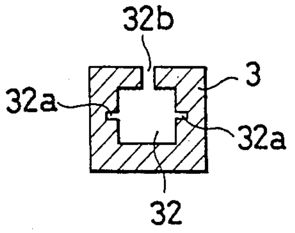
FIG. 7 is a sectional view taken along the line VII—VII of FIG. 3.

As shown in FIG. 6, the first arm 2 is provided therein with a first guide groove 31 for passing a clamper 20, and first supporting grooves 31*a* formed on both sides of the first guide groove 31. The first supporting grooves 31*a* are adapted to support both sides of a web-like flexible member 18 and to guide the same to the end of the first arm 2.

The first arm 2 also has a first crevice 31*b* formed in the inner surface thereof adjacent the second arm 3 and communicating with the first guide groove 31. When the filamentary fastener L is curved in a loop form, the filament portion F of the fastener passes through this crevice 31*b*. The crevice 31*b* is broadened at the end of the first arm 2 so that the socket portion H of the fastener L may be taken out therethrough.

The end of the first guide groove 31 has a first fixing portion 31*c* for gripping the socket portion H of the fastener L as shown in FIG. 9. The first fixing portion can have any desired construction provided that it permits the insertion of the socket from the lateral side by means of a later-mentioned clamper and the downward or lateral withdrawal of the socket portion H of the fastener L after the connection of the ends of the fastener L.

On the other hand, the second arm 3 has a second guide groove 32 having a section similar to that of the first guide groove 31. The second arm 3 is provided with second supporting grooves 32*a* at both sides of the second guide groove 32 for sliding both ends of a web-like flexible member 16, and also with a second crevice 32*b* through which the filament portion F is withdrawn towards the first arm 2.

As shown in FIG. 8, the second supporting groove 32*a* is extended from the end of the second arm 3 to a portion of the latter near the feed port 34 for the fastener L. The second supporting groove 32*a* merges in the first supporting groove 31*a* at a position near the feed port 34 and is connected to a recess 39 for receiving a pulley 16.

The second guide groove 32 merges in the first guide groove 31 at a position near the feed port 34. The terminal ends 31*d* and 32*d* are positioned ahead of the pulley 16 as shown in FIG. 5.

A branching point 33 is located at the position where the first guide groove 31 and the second guide groove 32 merge in each other.

Figure 5:
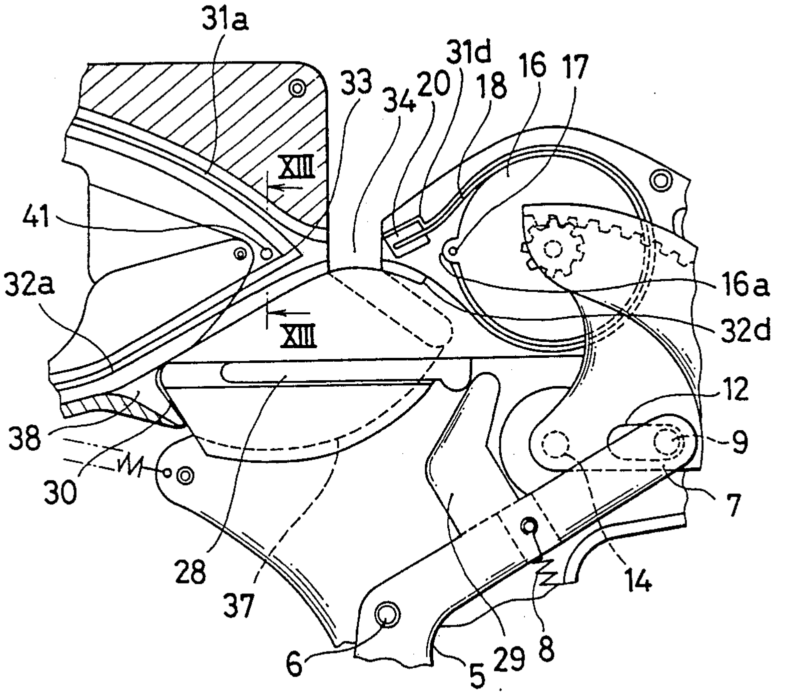
FIG. 5 is an enlarged view of an essential part of the fastener connecting device of the invention.
Figure 13:
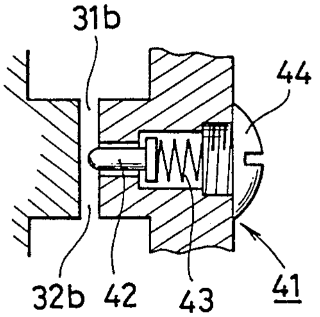
FIG. 13 is a sectional view taken along the line XIII—XIII of FIG. 5.

As shown in FIG. 5, a retainer 41 for temporarily supporting the filament portion F of the fastener is disposed in the vicinity of the branching point 33. As will be seen from FIG. 13, the retaining member 41 is composed of a pin 42, third spring 43 and a cap 44. The spring 43 serves to project the end of the pin 42 to a portion where the first crevice 31*b* and the second crevice 32*b* merge in each other.

On the other hand, the end of the second arm 3 has a second fixing portion 32*c* for gripping the pin portion I of the fastener L. This second fixing portion 32*c* has, as shown in FIG. 10, a pair of L-shaped clampers 45 arranged to open and close relative to each other, and a pair of protecting plates 46 fixed to the upper surfaces of the clampers 45. A hole 47 for receiving the pin portion I is formed in the juncture between the protecting plates 46.

FIG. 11 shows another example of the second fixing portion 32*c*. This second fixing portion 32*c* has a split-type clamper 55 having a bottom-equipped cylindrical form and protecting plates 56 fixed to the upper side of the clamper 55. A hole 47 for receiving the pin portion I of the fastener L is formed in the juncture between the protecting plates 56.

Briefly, the second fixing portion 32*c* is constructed to clamp the pin portion I of the fastener by its resiliency. The pin portion I is inserted from the side adjacent to the second guide groove 32. The clamping is released as the filament portion F extracted through the second crevice 32*b* is pulled.

As will be seen from FIGS. 4 and 5, the flexible member 18 is wound round the periphery of the pulley 16. One end of the flexible member 18 constitutes a connecting portion 21 which is supported by a pin 17 on the projection 16*a* of the pulley 16.

Figure 12:
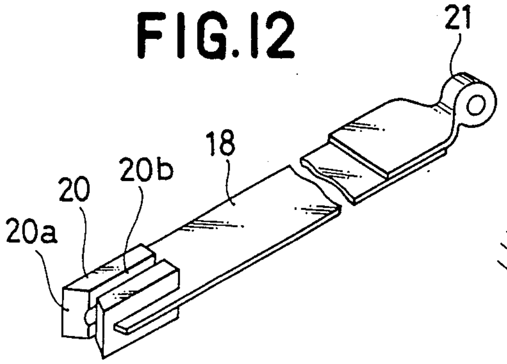
FIG. 12 is a perspective view of a flexible member.

As will be seen from FIG. 12, the front end of the flexible member 18 constitutes a clamper 20 which is provided at its end with a groove-shaped gripping portion 20*a* and in the upper surface thereof with a groove 20*b* for receiving the filament portion F.

As will be seen from FIG. 5, the pulley 16 is mounted on the main body 1 such that the projection 16*a* is directed forwardly of the main body 1. The flexible member 18 has such a length as to reach the first and second fixing portions 31*c* and 32*c* when the pulley 16 makes one rotation. The circumferential length of the pulley 16 is substantially equal to the length of the flexible member 18.

If the flexible member 18 is extremely short, the clamper 20 on the end of the flexible member does not reach the first fixing portion 31*c* nor the second fixing portion 32*c*. It will be understood also that, if the circumferential length of the pulley 16 is smaller than the flexible member 18, it is not possible to turn the end of the flexible member 18 by unwinding the latter by one rotation of the pulley.

The flexible member 18 is a stiff film such as a web-like polyester film, adapted to be wound on or unwound from the periphery of the pulley 16 as the latter rotates.

It is essential that the flexible member 18 has a function to deliver the socket portion H and the pin portion I of the fastener to the first fixing portion 31*c* and the second fixing portion 32*c*, respectively. To this end, films made of synthetic resins such as polyester, nylon and polycarbonate, although a thin metal plate can be used as the material of the flexible member 18.

As shown in FIG. 4, the main body 1 is provided therein with a groove portion 27 in which slidably disposed is a slider 28. The slider 28 is movable forwardly as it is pushed forwardly as it is pressed at a pressing portion 29 so that it presses at its end the operating surface 30 of the second arm 3 thereby to bring the end of the second arm 3 closer to the end of the first arm 2.

As shown in FIG. 8, a sector-shaped first passage 37 is provided in the rear surface of the slider 28. A second passage 38 is provided on the operating surface 30 so as to correspond to the first passage 37.

The center of the first passage is constituted by the retaining member 41. The feed port 34 communicating with the first passage is on the extension of the first guide groove 31 so that the pin portion I of the fastener can get into the first passage 37 easily.

The fastener connecting device of the present invention operates in a manner explained hereinunder.

(1) Preparatory Operation

Figure 14:
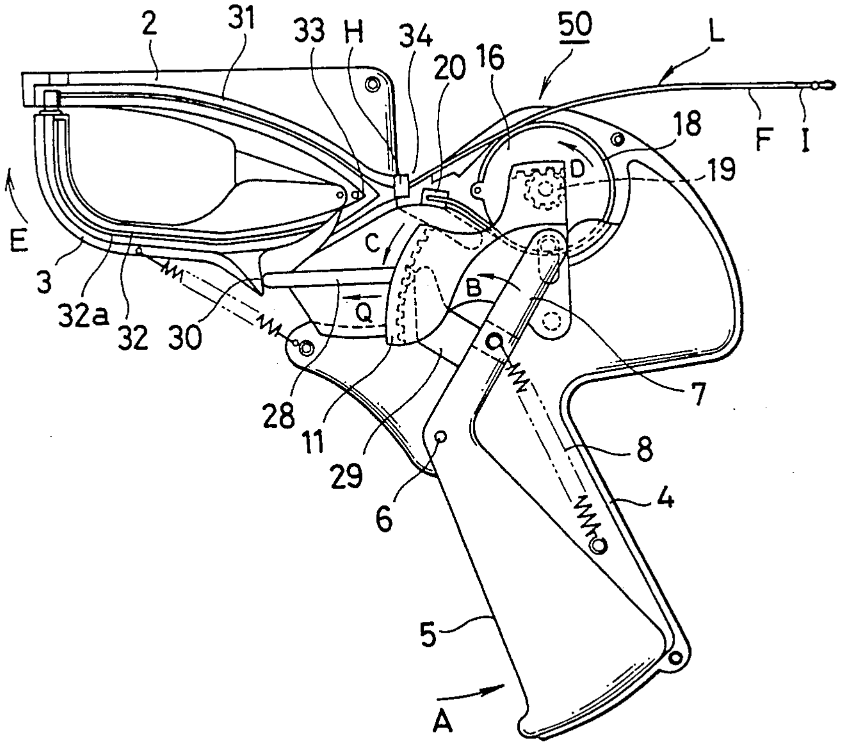
FIGS. 14 to 21 are illustrations of operation of the connecting device.

FIG. 14 shows the state in which the lever 5 is gripped to the maximum degree. As the lever 5 is gripped to the maximum, the gripper 4 rotates as indicated by an arrow A so that the extension 7 of the same rotates as indicated by an arrow B. In response to this rotation, the internally-toothed gear 11 is rotated counter-clockwise as shown by an arrow C. At the same time, the pinion 19 meshing with the internally-toothed gear 11 rotates in the direction of an arrow D, thereby to wind the flexible member 18 counter-clockwise up around the pulley 16.

The pulley 16 rotates twice as the lever 5 is gripped as explained above. The flexible member 18 wound round the pulley 16 as shown in FIG. 4 and the clamper 20 fixed to the end of the flexible member 18 is paid-off into the second guide groove 32 while being guided by the second supporting grooves 32*a* formed at both sides of the second guide groove 32, and then the whole length of the gripper 20 is wound up around the pulley 16.

FIG. 4 shows the device in the state in which the lever 5 is not gripped, while FIG. 14 shows the same in the state in which the lever 5 has been gripped to the maximum degree. In the state shown in FIG. 4, the flexible member 18 is wound counter-clockwise on the periphery of the pulley 16, while the clamper 20 is directed towards the second arm 3. In the state shown in FIG. 14, however, the flexible member 18 is wound clockwisely around the pulley 16, so that the clamper 20 is to be received by the first guide groove 31 in the first arm 2.

(2) Initial Loading of Cord

The device is thus ready for loading a fastener L. Then, the socket portion H of the fastener L is inserted into the feed port 34 provided in the vicinity of the branching point 33.

In the state shown in FIG. 14, since the pressing portion 29 of the lever 5 presses the rear end of the slider 28, the slider 28 moves in the direction of an arrow Q to make contact with the operating surface 30 on the lower side of the second arm 3 so that the second arm 3 is pressed and rotated as indicated by an arrow E.

Therefore, if the device 50 is loaded with the fastener L, the pin portion I of the fastener L is received by the socket portion H as the first and second arms 2 and 3 get closer to each other.

Figure 15:
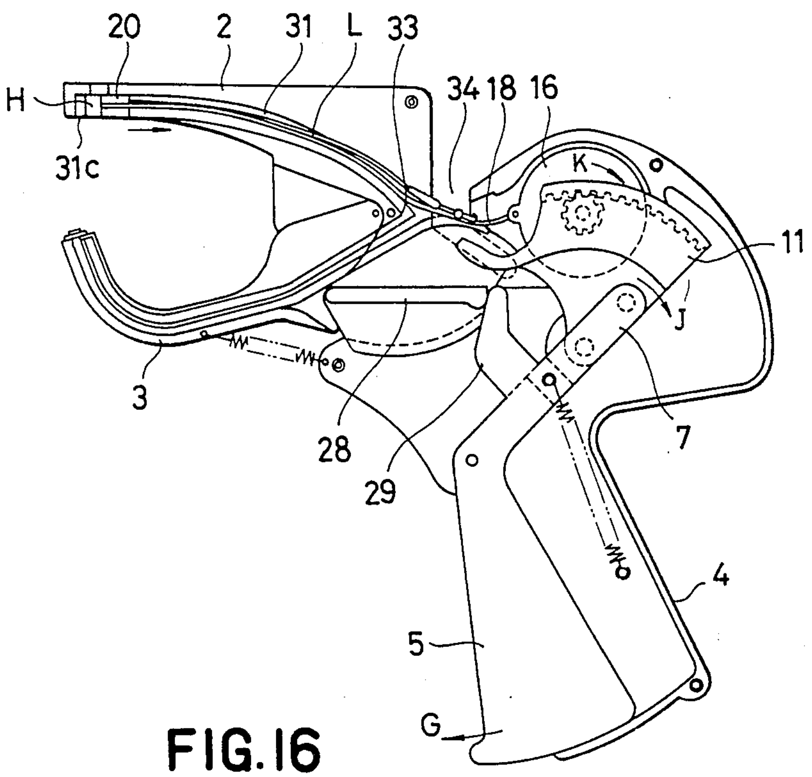

FIG. 15 shows the state in which the lever 5 is on the midway of its returning stroke indicated by an arrow G. As the extension 7 of the lever 5 rotates in the direction of an arrow J, the pulley 16 rotates clockwise as indicated by an arrow K, so that the flexible member 18 is moved from the position shown in FIG. 14 into the first guide groove 31.

Since the flexible member 18 is guided by the first supporting grooves 31*a* formed at both sides of the first guide groove 31, the clamper 20 is fed into the first guide groove 31.

As a result, the clamper 20 presses the socket portion H of the fastener into the first fixing portion 31*c* on the end of the first arm 2.

Figure 16:
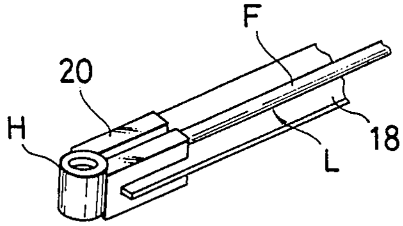

FIG. 16 shows the device in the state in which the clamper 20 grips the socket portion of the fastener and guides the same through the first guide groove 31.

Figure 17:
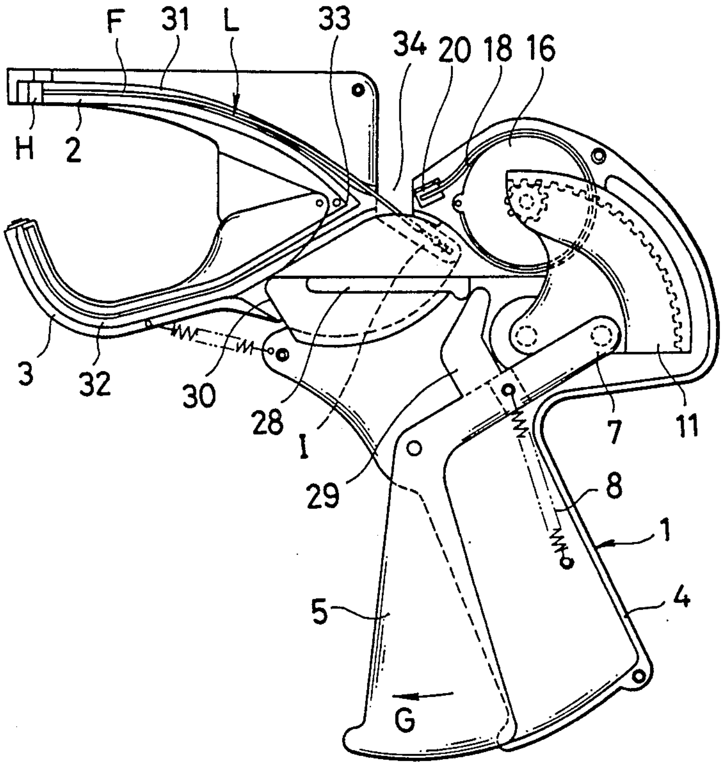

Then, as lever 5 is released as indicated by an arrow to project from the grip 4 as shown in FIG. 17, the clamper 20 is retracted to the terminal end 32*d* of the second guide groove and is directed to the second guide groove 32 adjacent to the second arm 3. In this state, the flexible member 18 is wound counter-clockwise on the periphery of the pulley 16.

In the state shown in FIG. 17, a substantial portion of the fastener L is received by the first guide groove 31 and only the pin portion I is positioned at the feed port 34.

As will be understood from this Figure, the clamper 20 is positioned behind the pin portion I of the fastener, so that the filament portion F is forced out by the next pressing operation of the flexible member 18.

(3) Penetrating Operation

Figure 18:
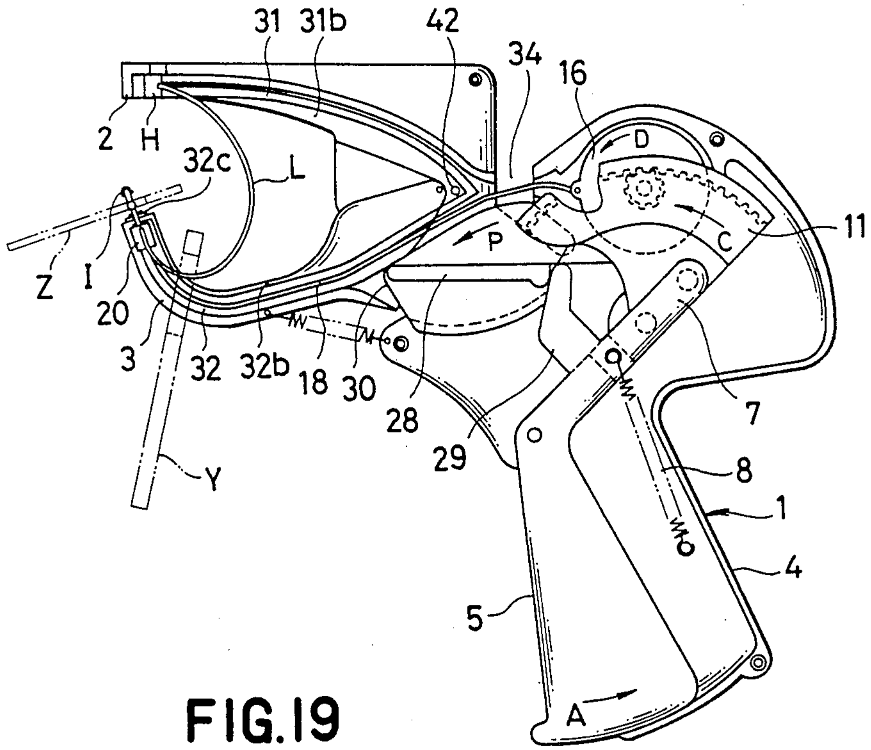
Figure 19:
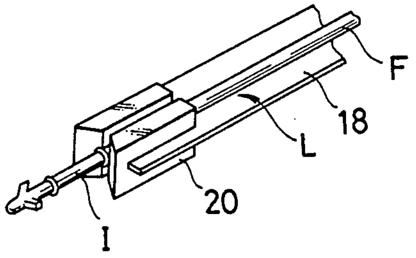

As shown in FIG. 18, as the lever 5 is gripped again as indicated by arrow A, the pulley 16 is rotated in the direction of the arrow D so that the flexible member 18 is moved in the direction of the arrow P along the second guide groove 32. Since the clamper 20 holds the filament portion F and pushes the same in the direction of the arrow P, the filament portion F of the fastener is temporarily stored by the pin 42 of the retaining member 41 and bent in a form like the letter U. Then, as the state of the device is changed from that shown in FIG. 17 to that shown in FIG. 18, the clamper 20 catches the pin portion I of the fastener and guides the same to the end of the second arm 3.

Then, as the clamper 20 approaches the end of the second arm 3, the tensile force produced by the clamper 20 comes to exceed the supporting force produced by the retaining member 41 so that the filament portion F of the fastener comes off the pin 42 of the retaining member 41 and is withdrawn through the first and second crevices 31*b* and 32*b*.

Subsequently, as the clamper 20 reaches the end of the second arm 3, the pin portion I of the fastener is clamped by the second fixing portion 32*c*.

In the state shown in FIG. 18, the pressing member 29 provided on the upper surface of the lever 5 has made an approach to the rear end of the slider 28. In this state, however, the pressing member 29 has not driven the slider 28, so that the end of the second arm 3 has not started rising yet.

Figure 20:
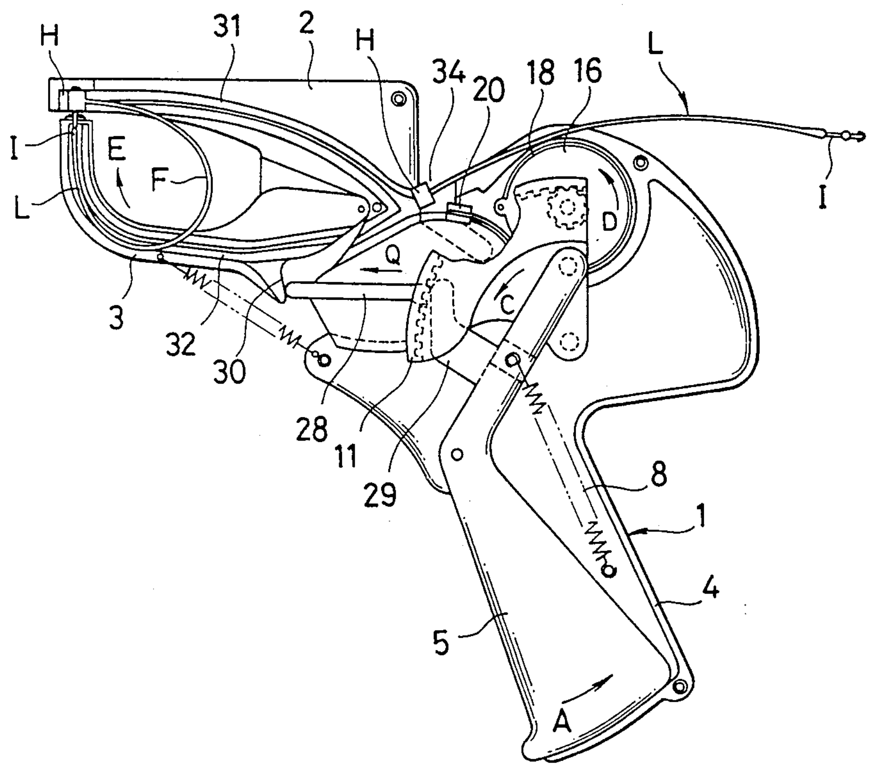

FIG. 20 shows the state immediately after the binding or fastening of the fastener. In response to a further rotation of the lever 5 in the direction of the arrow A, the pressing portion 29 on the upper part of the lever 5 presses the slider 28 in the direction of the arrow Q. Consequently, the operation surface 30 is pressed by the end of the slider 28 to raise the second arm 3 in the direction of the arrow E, and the pin portion I clamped by the second fixing portion 32*c* on the end of the second arm 3 is received by the hole 107 in the socket portion H of the fastener L clamped by the first fixing portion 31*c* of the first arm 2, so that the ends of the fastener L are connected to each other to complete a loop of the fastener L.

By making the pin portion I penetrate a tag or label Z and the goods Y as illustrated, the tag or label Z is attached to the goods Y by inserting the pin portion I into the socket portion H of the fastener.

In the state in which the lever 5 is deeply pressed into the grip 4 as shown in FIG. 20, the internally-toothed gear 11 and the pulley 16 rotate counter-clockwise as indicated by arrows C and D thereby to wind up the flexible member 18 clockwisely on the surface of the pulley 16. Consequently, the clamper has been returned to the position retracted from the socket portion H of a fastener L which is to be fed next. In this state, the clamper 20 is ready to be inserted into the first guide groove 31 of the first arm 2.

(4) Taking Out of Fastner

Figure 21:
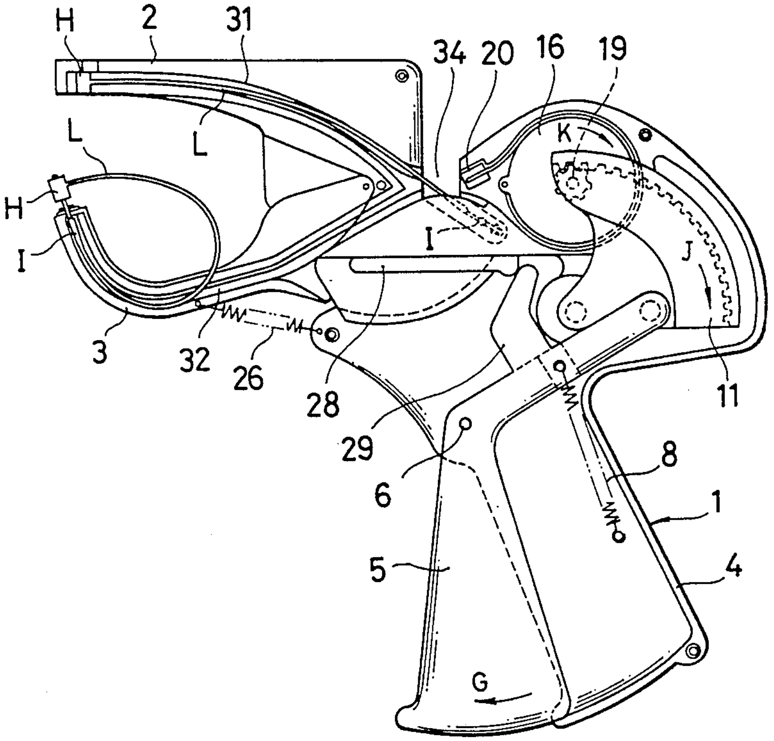

After the completion of the fastener L in the state shown in FIG. 20, as the lever 5 is released as shown in FIG. 21, the lever 5 is rotated in the direction of the arrow G so that the internally-toothed gear 11 rotates clockwise as shown by the arrow J. As a result, the pulley 16 integral with the pinion 19 meshing with this internally-toothed gear 11 is rotated clockwisely to extend the flexible member 18 from the position shown in FIG. 20 into the first guide groove 31 in the first arm 2, thereby to fit the socket portion H of the fastener to the first fixing portion 31 of the first arm 2. Then, the flexible member 18 is wound again counter-clockwise on the peripheral surface of the pulley 16 as shown in FIG. 21 so that the clamper 20 on the end of the flexible member 18 is positioned behind the fastener L, so as to be ready for insertion into the second guide groove 32 of the second arm 3.

As the lever 5 is projected out of the grip 4 as stated above, the pressing portion 29 provided on the upper portion of the lever 5 is retracted so that the slider 28 is freed from the pressing portion 29 and moved rearwardly together with the second arm 3 by the resiliency of the second spring 26 on the second arm 3.

As the ends of the fastener L are connected together to complete a loop, the first guide groove 31 is loaded with a next fastener L and the clamper 20 is stationed at the side rear of the pin portion I to prepare for the connecting operation.

I claim:

1. A method for connecting the pin end to the socket end of a fastener having a filament portion of predetermined length with a pin end on one end thereof and socket end on the other end thereof, using an apparatus comprising a main body, a first arm having a first guide groove therein and connected at one end thereof to said main body, a first fixing portion disposed on the end of said first arm opposite the end connected to said main body, a second arm rockably secured at one end thereof to said first arm, a flexible member disposed within said main body and being shaped so as to be guided by said first and second guide grooves when directed theretoward, and clamping means provided on an end of said flexible member for clamping either the pin end or the socket end of a fastener, the method comprising the steps of:

guiding the socket end of a fastener through said first guide means until the socket end is positioned at the end of said first arm distal from said main body;

guiding the pin end of the same fastener through said second guide means until the pin end is positioned at the end of said second arm distal from the end secured to said first arm; and bringing said second arm close enough to said first arm to cause the pin end of the fastener to be inserted in the socket end thereof.

2. A method for connecting the pin end to the socket end of a fastener having a filament portion of predetermined length with a pin end on one end thereof and socket end on the other end thereof, using an apparatus comprising a main body, a first arm having a first guide groove therein and connected at one end thereof to said main body, a first fixing portion disposed on the end of said first arm opposite the end connected to said main body, a second arm rockably secured at one end thereof to said first arm and having a second guide groove therein, a second fixing portion disposed on the end of said second arm opposite to the end thereof secured to said first arm, a flexible member disposed within said main body and being shaped so as to be guided by said first and second guide grooves when directed theretoward, and clamping means provided on an end of said flexible member for clamping either the pin end or the socket end of a fastener, the method comprising the steps of:

clamping the socket end of a fastener with said clamping means of said flexible member;

guiding the socket end through said first guide means until the socket end is positioned to be fixed by said first fixing portion;

fixing the socket end at the end of said first arm by means of said first fixing portion;

retracting said flexible member and clamping means;

clamping the pin end of the same loaded fastener with the clamping means of said flexible member;

guiding the pin end through said second guide means until the pin end is positioned to be fixed by said second fixing portion;

fixing the pin end at the end of said second arm by means of said second fixing portion; and bringing said second fixing portion close enough to said first fixing portion to cause the pin end of the fastener to be inserted in the socket end thereof.

* * * * *